(12) United States Patent
Yuan et al.

(10) Patent No.: US 6,294,211 B1
(45) Date of Patent: *Sep. 25, 2001

(54) METHOD OF DISINFECTING A FOODSTUFF USING GASEOUS OZONE

(75) Inventors: James T. C. Yuan, Naperville; Edward F. Steiner, Lombard, both of IL (US)

(73) Assignee: American Air Liquide Inc., Walnut Creek, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/525,125

(22) Filed: Mar. 14, 2000

Related U.S. Application Data

(63) Continuation of application No. 09/159,095, filed on Sep. 23, 1998, now Pat. No. 6,066,348.

(51) Int. Cl.[7] ............... A21D 6/00; A21D 4/00
(52) U.S. Cl. .......... 426/235; 426/320; 426/335; 426/442; 422/24; 422/28
(58) Field of Search .................. 426/236, 320, 426/335, 248, 235, 442; 422/24, 28, 40, 186.07

(56) References Cited

U.S. PATENT DOCUMENTS

| 3,341,280 | * | 9/1967 | Eolkin .................... 422/24 |
| 5,011,699 | * | 4/1991 | Mitsuda et al. . |
| 5,352,467 | * | 10/1994 | Mitchell et al. . |
| 5,783,242 | * | 7/1998 | Teague . |
| 5,965,087 | * | 10/1999 | Caracciolo, Jr. ............ 422/28 |
| 6,086,833 | * | 7/2000 | Conners et al. ............ 422/292 |
| 6,120,822 | * | 9/2000 | Denvir et al. ............ 426/320 |

FOREIGN PATENT DOCUMENTS

| 32 09 930 | * | 9/1983 | (DE) . |
| 39 17 250 | * | 12/1990 | (DE) . |
| 43 32 802 | * | 3/1995 | (DE) . |
| 44 26 648 | * | 1/1996 | (DE) . |
| 196 01 921 | * | 7/1997 | (DE) . |
| WO 92/04276 | * | 3/1992 | (WO) . |
| WO 93/03622 | * | 3/1993 | (WO) . |

* cited by examiner

Primary Examiner—Nina Bhat
(74) Attorney, Agent, or Firm—Oblon, Spivak, McClelland, Maier & Neustadt, P.C.

(57) ABSTRACT

The present invention provides a method of disinfecting a foodstuff using a gaseous mixture containing ozone in an amount and for a time sufficient to effect disinfection.

91 Claims, 1 Drawing Sheet

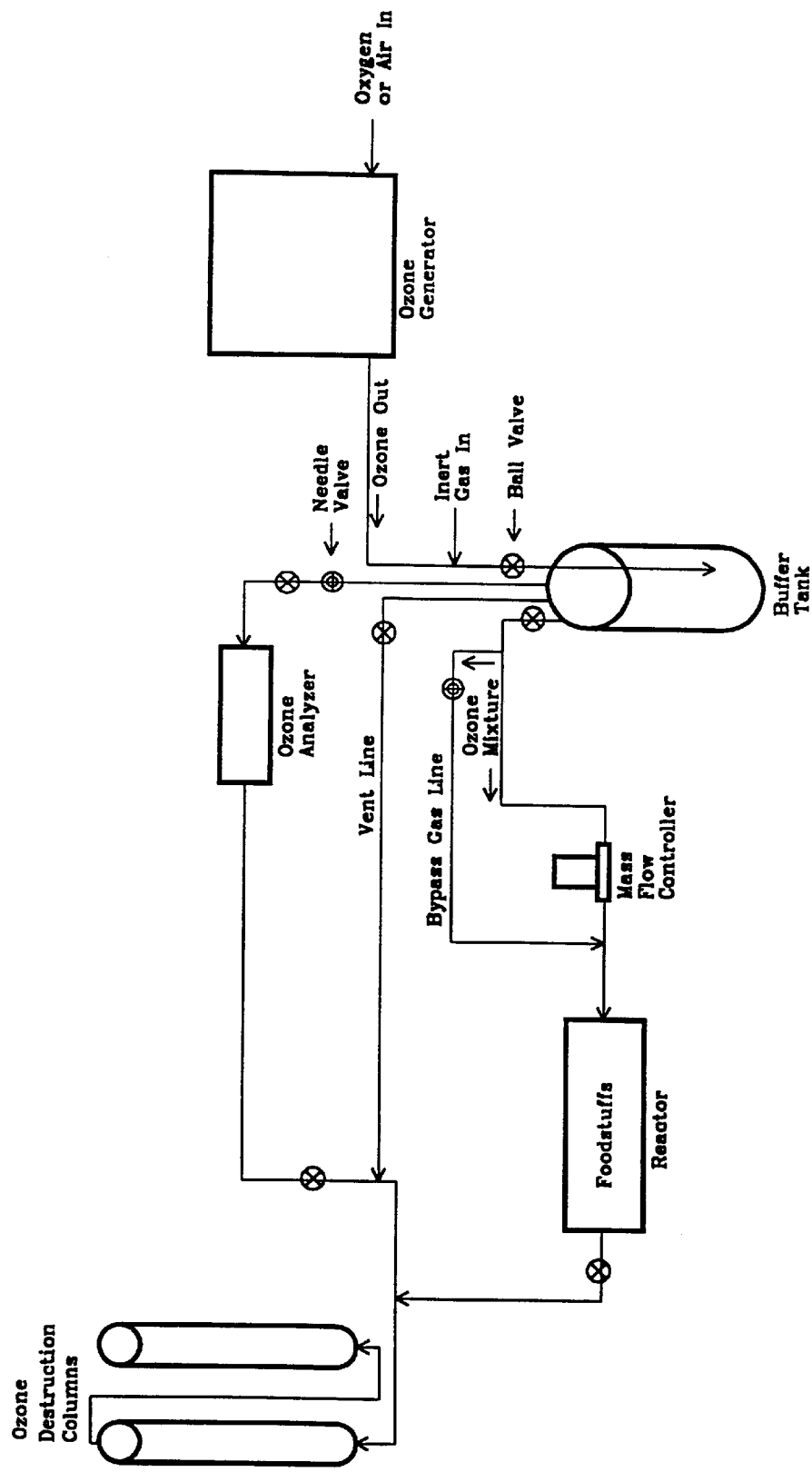
Figure 1. Gaseous Ozone Disinfection Experimental Setup

METHOD OF DISINFECTING A FOODSTUFF USING GASEOUS OZONE

This is a continuation of application Ser. No. 09/159,095 filed on Sep. 23, 1998 now U.S. Pat. No. 6,066,348.

BACKGROUND OF THE INVENTION

1. Field of the Invention:

The present invention relates to a method of disinfecting a foodstuff using gaseous ozone whereby the quality of the foodstuff so treated can be maintained over time.

2. Description of the Background

Ozone has been used as a disinfectant/oxidant in the food industry for several decades and is commercially available. Ozone is generally produced by subjecting oxygen to ultraviolet radiation having a wavelength below 200 nm or by corona discharge, and has been used in bulk storage of produce and in disinfection of water either in municipal drinking facilities or for waste water treatment. Disinfection processes have been developed using ozone solutions by bubbling ozone gas through water to sanitize/disinfect food products. Although some gaseous ozone treatments have been proposed for the sterilization of foodstuffs, all lack effective means for delivering gaseous ozone or mixtures containing the same to or into the foodstuffs being treated.

The following U.S. Pat. Nos. are noted.

U.S. Pat. No. 5,431,939 describes a method for treating a shell egg using biocidally active gases including ozone, however, the process requires heating the egg to more than 129.9° F. At elevated temperatures, ozone is more unstable and easily decomposes.

U.S. Pat. No. 4,549,477 describes an ozone treatment apparatus for treating food using a conveyor means for continuous processing. However, such a process design renders it impossible to employ vacuum and/or pressure during gaseous ozone treatment.

U.S. Pat. No. 5,227,184 describes a method for sanitizing food products using aqueous ozone.

U.S. Pat. No. 4,376,130 describes the ozonolysis of whole cardamon seeds using aqueous ozone.

U.S. Pat. No. 4,849,237 describes a method for sanitizing poultry carcasses using aqueous ozone.

U.S. Pat. No. 4,256,574 describes an ozone system for applying ozone to waste water for disinfection.

U.S. Pat. No. 5,053,140 describes an apparatus and a process for applying ozone to waste water to remove fats, solids and bacteria therein.

U.S. Pat. No. 5,087,466 describes a process for treating animal flesh to remove color and odor. The flesh is mixed with water and this aqueous mixture is placed in contact with ozone.

U.S. Pat. No. 5,015,442 describes an apparatus for sterilizing and deodorizing air to remove odors therefrom.

U.S. Pat. No. 5,011,599 describes a process for decomposing the herbicide, atrazine, in waste water.

U.S. Pat. No. 5,213,759 describes a method of sterilizing microorganisms by using both ozone gas and ultraviolet radiation to obtain a synergistic effect.

U.S. Pat. No. 5,011,699 describes a process for sterilizing foodstuffs using mixtures of ozone gas, carbon dioxide and nitrogen using high concentrations of ozone, i.e., from 33.3% to 66.7% of ozone.

U.S. Pat. No. 5,281,428 describes a method and apparatus for treating and packaging raw meat by first exposing the meat to a vacuum, flushing the surface of the meat with an air-free treatment gas, and re-exposing the meat to vacuum.

The shortcomings of such conventional methods for sterilizing foodstuffs, and particularly, with gaseous ozone is unfortunate as microbial growth in foods is a primary problem for public health. If pathogenic microorganisms are present in foods, food-borne outbreaks may occur that can cause significant economic loss. In 1997 alone, there were 9,000 estimated deaths and over 15 billion dollars of total cost associated with food-borne illnesses.

Food spoilage and/or pathogenic microorganisms primarily originate from ingredients in foodstuffs or from cross-contamination from contact with surfaces or environments during manufacturing processes. Currently, food manufacturers use different methodologies to eliminate, retard or prevent microbial outgrowth, such as heating and irradiation. Unfortunately, an effective means for inhibiting or preventing microorganism growth in foodstuffs remains elusive.

SUMMARY OF THE INVENTION

Accordingly, it is an object of the present invention to provide a method of disinfecting a foodstuff which eliminates or significantly reduces spoilage and eliminates or reduces viability of pathogenic microorganisms, bacterial and fungal spores, as well as viruses in foodstuffs.

It is, in particular, an object of the present invention to provide a method of disinfecting foodstuffs using gaseous ozone or mixtures containing the same with foodstuffs as diverse as meat, poultry, seafood, fresh produce, pasta, juices, immediate-moisture foods and dry foods, including snack foods.

The above object and others are provided by a method of disinfecting a foodstuff using a gaseous mixture containing an effective amount of ozone, which entails subjecting a foodstuff to the mixture prior to, during or after preparing the foodstuff, for a time period effective to substantially disinfect the foodstuff.

BRIEF DESCRIPTION OF THE DRAWINGS

The drawing illustrates a gaseous ozone disinfection experimental flowplan of the present invention.

DESCRIPTION OF THE PREFERRED EMBODIMENTS

In accordance with the present invention, a process is provided for disinfecting and/or sanitizing a foodstuff using a gaseous mixture containing an effective amount of ozone which may be used prior to, during all of or a portion of a food manufacturing process, or thereafter, to eliminate or significantly reduce spoilage as well as eliminate or, at least, reduce pathogenic microorganisms, bacterial or fungal spores, or viruses in a foodstuff. As used herein, the term "foodstuff" generally refers to all types of foods which are as diverse as meats, particularly ground beef, poultry, seafood, fresh vegetables, fresh fruit, dry pasta, juices, breads and cereals and fried or baked snack foods, but not limited thereto. More specifically, the present invention may be used in conjunction with any foodstuff that is able to support microbial, i.e. fungal, bacterial or viral growth. Thus, the present process may be applied to dry foods, defined as having a moisture content below about 15% by weight and a water activity below 0.60, as well as to intermediate-moisture free foods, defined as having a moisture content ranging from about 15 to 55% by weight with a water activity ranging from about 0.60 to about 0.88. It has been surprisingly discovered that the present invention allows the quality of a treated foodstuff to be extended by a significant period of time, whereby the microbial content of all packaged food products can be reduced, thereby enhancing the quality of the foodstuff.

Generally, in the present invention, water activity ($a_w$) is an indication of free water in the product. Free water means the water is neither chemically nor physically bound. ($a_w$) is defined, more precisely as follows:

$$(a_w)=P/P_o$$

wherein P is the vapor pressure of water in the food, and $P_o$ is the vapor pressure of pure water at a given temperature.

Generally, the present invention entails applying a gaseous mixture containing an effective amount of ozone to a foodstuff for an amount of time effective to disinfect the foodstuff through direct contact with the foodstuff to effect significant reduction of spoilage and pathogenic microorganisms.

As noted above, the present invention may be used at any stage or all stages of a foodstuff manufacturing process. For example, in accordance with the present invention, a gaseous mixture containing ozone may be applied before the foodstuff is prepared, which is to say that it may be used to disinfect ingredients used to make the foodstuff.

However, the gaseous mixture containing ozone may also be used at any or all stages during the preparation and storage of the foodstuff.

Alternatively, the foodstuff may be subjected to the gaseous mixture containing ozone after the foodstuff is prepared and prior to packaging, for example.

Additionally, the present invention also specifically contemplates use of the present invention at all of the above stages of foodstuff preparation, i.e. before, during and after preparation and during all or a portion of storage time.

In one embodiment of the present process, a continuous gaseous ozone treatment may be used having relative humidity, various flow rates and different C*T values where C is ozone dose (generally defined in ppm or % by wt.) and T is ozone contact time, (generally defined in seconds, minutes or hours). Generally, ozone concentration in the gaseous mixture is from about 0.1 ppm to about 15% by wt, with the balance being inert or non-reactive gases, i.e., non-reactive with the foodstuff being treated. Moreover, the treatment time is generally from about 1 second to about 10 hours.

CT is total ozone dose (mg/min) applied to a foodstuff during a given period of time. There are only a few other ways to express ozone dose, such as ppm or % by wt. These terms can be used in the present invention, if preferred, with conversion factors, which are known.

Using the standard conversion, if the ozone dose were 1 mg/min, and a foodstuff were treated for five minutes, then the CT value therefor would be 1 (mg/min)×5 (min)=5 (mg). In the present invention, gms are used as the CT unit.

In another embodiment of the present invention, a batch gaseous ozone treatment is used to deliver constant ozone dose to disinfect foodstuffs.

In yet another embodiment of the present invention, pressurized gaseous ozone is used with efficacy to considerable disinfection of foodstuffs.

In still another embodiment of the present invention, a vacuum treatment is used to remove all residual air in the interstitial spaces of the food and then to treat the food with any of the three processes mentioned above separately or in combination to enhance ozone efficacy in the disinfection of the foodstuffs.

Additionally, the present invention also specifically contemplates use of any of the above four processes in combination to achieve excellent results.

Generally, the temperature used in the present invention is from 0.1° C. to ambient, the latter of which may be as high as 70° C. However, in general, heating is avoided in the present invention as it tends to promote ozone decomposition.

Generally, inert gas or inert gas mixtures are applied along with gaseous ozone in the process of the present invention. Generally, as used herein, the term "inert gas" refers to any non-oxidative or non-reactive gas and includes gases such as nitrogen, carbon dioxide, argon, krypton, xenon and neon or any combination thereof.

The inert gas satisfies four principal functions when used in conjunction with the gaseous ozone in the present invention.

First, the inert gas or gas mixtures are used to chill down or maintain the cold temperature of the food products during processing. Generally, temperatures used are from about 1 to 10° C. to accomplish this result.

Secondly, the inert gases or gas mixtures provide optimal atmospheric environment against oxidative degradation or any other deterioration of quality, such as deterioration of color, flavor, aroma, appearance, texture, or chemical stability of products.

Third, the inert gas or inert gas mixtures provide a desired pressure during the process, which generally ranges from about 0.1 to 20 bar.

Finally, the inert gas or inert gas mixtures may enhance ozone anti-bactericidal efficacy.

In accordance with the present invention, a primary treatment is utilized whereby gaseous ozone is injected along with inert gas or inert gas mixtures into the food manufacturing process equipment in the presence of the food or food precursors, i.e., by blending or mixing, to disinfect the foodstuffs. Generally, the total ozone dose is represented by C*T, where C is the ozone dose produced by the ozone generator, typically ranging from about 0.1 ppm to 15% by weight with the balance being one or more inert or non-reactive gases, and T is the ozone contact time, generally from about 1 second to about 10 hours.

Generally, the feed gas for producing ozone by UV or corona discharge apparatus includes, but is not limited to oxygen, air, or a mixture of oxygen and air or a mixture of oxygen, air with the inert gas which may be any one of or a mixture of nitrogen, carbon dioxide, argon, krypton, xenon and neon.

Generally, the inert gas constitutes from about 10 to 99% by weight of the total concentration of the gas used in the process, and may be injected with ozone together or separately into the process equipment in the presence of the foodstuff.

In general, the temperature of the processing is maintained at from about 0 to 70° C.

Preferably, however, the following parameters are used.

For continuous gaseous ozone streams, generally, the value of C which is the ozone dose produced by the ozone generator, will preferably range from 0.1 ppm to about 15% by weight. T, the ozone contact time, preferably ranges from about 1 second to 10 hours with a relative humidity ranging from about 1 to 100% R.H. (relative humidity), and with a flowrate of from about 0.001 to 100 liter/sec.

When a batch gaseous ozone treatment is used to deliver a constant ozone C*T, the value of C will preferably range from about 0.1 ppm to 15% by weight, and value of T, the ozone contact time, will preferably range from about 1 second to 10 hours.

When pressurized gaseous ozone is used, a pressure ranging from about 0.1 to 20 bar is preferably used to enhance ozone efficacy on disinfection of foodstuffs.

Finally, when vacuum treatment is used a vacuum ranging from about 0.1 to 30 torr of Hg for 1 second to 1 hour is used to remove most or preferably all residual air in the interstitial spaces and then treatment with any of the above processes alone or in combination may be effected.

As used herein, the term "substantially disinfect" means the attainment of a safe level of microorganisms in the foodstuff, which is generally the elimination of at least 99% of all microorganisms, including pathogenic microorganisms, in the foodstuff treated. Preferably, at least 99.9% of such microorganisms are eliminated.

The present invention may be used to advantage to destroy viruses, bacterial and/or fungi. Preferably, the microorganisms destroyed are those causing food-borne illnesses. As used herein, the term "food-borne" illness means any single or combination of illnesses caused by microorganisms in mammals consuming foods containing those microorganisms.

Examples of bacteria causing such illnesses are various species of *Salmonella, Staphylococcus, Streptococcus* and *Clostridium*. For example, *Escherichia coli*, including *E. coli* 0157:H7, *Salmonella typhimurium, Salmonella Schottmulleri, Salmonella choleraesuis, Salmonella enteritidis, Staphylococcus aureus, Streptococcus faecalis, Clostridium botulinum* and *Clostridium perfringens* may be noted. Generally, the present invention may be used to advantage against any bacteria which produce a toxin or an enzyme or both, for example, as a mechanism of pathogenicity.

For example, hyaluronidase, an enzyme that digests the intracellular cement, hyaluronic acid, is produced by some pathogenic strains of *Saphylococci, Streptococci* and *Clostridia*.

As examples of toxins, the neurotoxin of *Clostridium botulinum* and the enterotoxin produced by *Staphylococcus aureus* may be noted.

Example of fungi causing mycotoxicosis, a collective term for diseases induced by consumption of food made toxic by the growth of various fungi, are *Aspergillus flavus* growing in peanuts, peanut butter, rice, cereal grains and beans, for example, to produce any one of the many known aflatoxins. Another example is *Aspergillus ochraceus* growing in corn, grain, peanuts Brazil nuts, and cottonseed meal, for example, to produce the toxins, ochratotoxin A and B. Yet another example is a mycotoxin released by *Penicillium toxicarium* growing on rice which causes paralysis, blindness and death in experimental animals. Still another example is *Fusarium graminearum*.

Having described the present invention, reference will now be made to certain examples which are provided solely for purposes of illustration and are not intended to be limitative.

The following example was conducted using the gaseous ozone disinfection experimental setup illustrated in the drawing.

Initially, oxygen or air was fed to an ozone generator to produce a mixture of $O_2/O_3$ or $O_2/O_3/N_2$ which was then passed through a conduit to which inert gas was added. The mixture was then fed through any one or combination of i) an ozone analyzer via a needle valve and ball valve, ii) vent line via a ball valve, and/or iii) to a mass flow controller or by-pass line therearound to a foodstuff reactor. From any or all of i), ii) and/or iii) the mixture was passed to ozone destruction columns.

EXAMPLE

The following trials were conducted using the following foodstuffs:

1) ground meat 2) chicken breast 3) turkey breast tenderloins 4) dry pasta 5) breakfast cereal.

The following treatments were applied:

Food was placed in a reactor under ambient conditions. The reactor was closed and secured prior to the treatment. Once the treatment was over, the exhaust was opened and food was removed from the reactor for analysis. These procedures were the same for all treatments.

T1: Flush Only.

The food in the reactor was under an air atmosphere at the start of the treatment. Then, ozone mixture was introduced into the reactor at a flowrate of 3 liter/min. The reactor was also turned on at the same time as the gas was introduced. The duration of the treatment was 10 minutes.

T2: Pressure.

The food in the reactor was under an ozone mixture atmosphere at the start. Then, the reactor was pressurized to four atmospheres with an ozone mixture. The reactor was flushed with ozone prior to pressurization in order to have the same amount of ozone as in treatment 1. The reactor was turned on during pressurization and stayed on for 10 minutes. Ozone was introduced at the beginning of the run only.

T3: Vacuum and Flush.

The food in the blender was put under vacuum for 45 seconds. The vacuum was at 27 in. Hg. The vacuum was broken using one atmosphere of ozone with the exhaust valve closed. Then, the exhaust valve was opened and ozone was flushed through the chamber at a flowrate of 3 liter/min. The flow of ozone continued for eight minutes. Then, the ozone was turned off and the exhaust valve closed. The reactor remained running for an additional two minutes. This was done to keep the amount of ozone used and the duration of the treatment constant All samples were prepared aseptically, inoculated with E. coli (a mixture of three strains), and then treated with ozone under one of the above settings, i.e., T1, T2 and T3.

In order to better understand the methodology by which the examples were conducted reference is now made to the drawing which illustrates a gaseous ozone disinfection experimental setup.

Generally, the flow indicated in the drawing may be described as follows. Oxygen or air are introduced into the ozone generator to generate an ozone gas mixture of $O_2/O_3$ or $O_2/O_3/N_2$ which flows to a buffer tank via ball valve means, for example. Then, by means of additional ball valve means, ozone flows to i) an ozone analyzer, ii) vent line and/or iii) a foodstuff reactor either via mass flow control means or bypass gas line. After subjecting various foodstuffs to the gaseous ozone in the reactor, ozone is finally passed to ozone destruction columns.

The following results were obtained:

TABLE 1

Log reduction of *E. coli* on dry pasta after being treated under various conditions

| C*T (gm) | T1 | T2 | T3 |
|---|---|---|---|
| 1 | 2.56 | 2.17 | 2.67 |
| 0.55 | 2.64 | 2.93 | 3.79 |
| 0.3 | 1.81 | 2.42 | 2.49 |
| 0.15 | 1.93 | 2.46 | 2 |
| 0.078 | 1.78 | 2.18 | 2.22 |
| 0.004 | 1.7 | 1.02 | 1.44 |

TABLE 2

Log reductions of *E. coli* on breakfast cereal after treated with ozone under various conditions

| C*T (gm) | T1 | T2 | T3 |
|---|---|---|---|
| 0.04 | 0.56 | 0.58 | 0.72 |

TABLE 3

Log reductions of *E. coli* on turkey breast tenderloins surface after treated with ozone under various conditions

| C*T (gm) | T1 | T2 | T3 |
|---|---|---|---|
| 1.00 | 1.27 | 1.55 | 0.83 |

TABLE 4

Log reductions of *E. coli* on ground beef after treated with ozone under various conditions

| T*C (gm) | T1 | T2 | T3 |
|---|---|---|---|
| 1.40 | 0.89 | 0.45 | 0.13 |

TABLE 5

Log reductions of *E. coli* on chicken breast surface after treated with ozone under various conditions

| T*C (gm) | T1 | T2 | T3 |
|---|---|---|---|
| 1.00 | 1.88 | 2.19 | 1.3 |

The above Tables support several important conclusions.

First, the present method of disinfecting foodstuffs using a gas mixture containing ozone is an advantageous non-thermal processing technology to safeguard food safety. As noted earlier in the specification, while thermal processing is a very effective means of destroying pathogenic microorganisms, heat also deteriorates product quality (e.g., color, texture and appearance) and wholesomeness (e.g., nutrition value). As the gaseous ozone treatment of the present invention is a non-thermal method, the present invention affords a superior anti-biocidal effect against all pathogenic microorganisms while better preserving food quality and wholesomeness.

Second, by applying vacuum and/or pressure treatment, the ozone biocidal efficacy can be significantly improved whether the preferred technique entails the application of vacuum or pressure will depend upon the product quality. Generally, it is preferable to break the vacuum, if used, with the gaseous ozone mixture of the present invention. Moreover, it is also preferable to apply a vacuum and then pressure in order to achieve a further improvement in disinfection.

Third, in the present invention, it has been surprisingly discovered that ozone biocidal efficiency is better (more powerful) at lower temperature, i.e., from about 0° C. to 10° C. This is one reason why it is preferred to use carbon dioxide or nitrogen as a mixture thereof with ozone as either carbon dioxide or nitrogen or both can deliver a chilling effect to afford a synergistic effect with ozone.

Fourth, the present invention achieves a superior biocidal effect without using u.v. radiation.

Fifth, in general, the present invention achieves a superior biocidal effect using a relatively low amount of ozone.

Thus, as may be seen from the above tables, the present method of disinfecting a foodstuff using a gaseous mixture containing ozone is advantageous and efficacious in achieving disinfection of the foodstuff.

Finally, an important aspect of the present invention pertains to so-called "point-of-use" applications, where the present method of and apparatus for disinfecting a foodstuff may be used on-site for such disinfection. The term "on-site" means any location where a foodstuff is either prepared or processed for distribution or both. The term "processed" for distribution includes wrapping, sealing, or packaging the foodstuff for transport and sale thereof. This provides an advantage in terms of convenience for the user but also economy. An on-site disinfection methodology also enables increased flexibility in using the present invention.

Having described the present invention, it will now be apparent to one of ordinary skill in the art, that many changes and modifications may be made to the above-described embodiments without departing from the spirit and the scope of the present invention.

What is claimed and desired to be secured by Letters Patent of the United States is:

1. A method of disinfecting a foodstuff using a gaseous mixture containing ozone, which comprises:
   a) subjecting the foodstuff to a vacuum treatment in order to remove residual air therefrom; and then
   b) contacting said foodstuff with an effective amount of a gaseous mixture containing ozone at a temperature from 0.1° C.–20° C. under pressure for a time effective to substantially disinfect the foodstuff.

2. The method of claim 1, wherein said gaseous mixture containing ozone is introduced as a continuous gaseous stream in a food processing apparatus containing the foodstuff.

3. The method of claim 1, wherein said foodstuff is subjected to a batch treatment with said gaseous mixture containing ozone.

4. The method of claim 1, wherein said gaseous mixture containing ozone is generated by feeding oxygen, air or a mixture of oxygen and air to an ozone generator prior to treating said foodstuff.

5. The method of claim 3, wherein said gaseous mixture in said batch treatment comprises from 0.1 ppm to 15% by wt. of ozone, and is in contact with said foodstuff for from 1 sec. to 10 hrs.

6. The method of claim 1, wherein said gaseous mixture containing ozone further contains an inert gas selected from the group consisting of nitrogen, carbon dioxide, argon, krypton, xenon and neon.

7. The method of claim 1, wherein said foodstuff is selected from the group consisting of grains, meat, poultry, seafood, bread, cereal, pasta, juices, fruit, vegetables, snack products.

8. The method of claim 1, wherein said gaseous mixture contains from about 0.1 ppm to about 15% by wt. of ozone based upon the total weight of the gaseous mixture.

9. The method of claim 1, wherein said foodstuff is contacted with said gaseous mixture containing ozone for at least 1 sec.

10. The method of claim 9, wherein said foodstuff is contacted with said gaseous mixture containing ozone for from about 1 sec to about 10 hrs.

11. The method of claim 1, wherein said gaseous stream comprises from 0.1 ppm to 15% by wt. of ozone, and is in contact with said foodstuff for from 1 sec. to 10 hrs.

12. The method of claim 11, wherein said gaseous stream has a flowrate of 0.001 to 100 l/s.

13. The method of claim 1, wherein said gaseous mixture is at a pressure of from 0.1 to 20 bar.

14. The method of claim 1, wherein said vacuum treatment comprises subjecting said foodstuff to a reduced pressure of from about 0.1 to 30 in Hg from about 1 sec to about 24 hrs.

15. The method of claim 1, wherein said foodstuff is a dry foodstuff.

16. The method of claim 1, wherein said foodstuff is an intermediate-moisture foodstuff.

17. The method of claim 1, wherein said foodstuff is disinfected for bacteria causing food-borne illness in a mammal.

18. The method of claim 1, which is conducted without ultra-violet radiation.

19. The method of claim 1, in which not more than one vacuum step is employed.

20. The method of claim 1, wherein said vacuum treatment comprises subjecting the foodstuff to a vacuum of from about 0.1 to 30 torr of Hg for 1 sec. to 1 hr.

21. A method of disinfecting a foodstuff against bacteria causing food-borne illness using a gaseous mixture containing ozone, which comprises:
    a) subjecting the foodstuff to a vacuum treatment in order to remove residual air therefrom; and then
    b) contacting the foodstuff with a gaseous mixture containing ozone at a temperature from 0.1° C.–20° C. under pressure for a time effective to substantially disinfect the foodstuff.

22. The method of claim 21, wherein said bacteria is selected from the group consisting of bacteria producing a toxin, an enzyme or both, as a mechanism of pathogenicity.

23. The method of claim 22, wherein said bacteria is selected from the group consisting of species of *Salmonella, Staphylococcus, Streptococcus, Clostridium* and *Escherichia*.

24. The method of claim 22, wherein said toxin comprises neurotoxin or enterotoxin or both.

25. The method of claim 21, wherein said bacteria is selected from the group consisting of *Staphylococcus aureus, Streptococcus facialis, Clostridium botulinum, Clostridium perfringeus* and *Escherichia coli* 0157:H7.

26. The method of claim 21, wherein said foodstuff is ground beef.

27. The method of claim 21, wherein the gaseous mixture contains from about 0.1 ppm to about 15% by weight of ozone based upon the total weight of the gaseous mixture.

28. The method of claim 21, wherein the foodstuff is contacted with said gaseous mixture containing ozone for at least 1 sec.

29. The method of claim 27, wherein the foodstuff is contacted with said gaseous mixture containing ozone for from about 1 sec to 10 hours.

30. The method of claim 21, wherein the gaseous mixture is at a pressure of from 0.1 to 20 bar.

31. The method of claim 1, which is conducted without ultra-violet radiation.

32. The method of claim 21, wherein said vacuum treatment comprises subjecting the foodstuff to a vacuum of from about 0.1 to 30 torr of Hg for 1 sec. to 1 hr.

33. The method of claim 21, wherein at least 99% of all bacteria are eliminated.

34. The method of claim 30, wherein at least 99.9% of all bacteria are eliminated.

35. A method of disinfecting a foodstuff against fungi and preventing mycotoxicosis using a gaseous mixture containing ozone, which comprises:
    a) subjecting the foodstuff to a vacuum treatment in order to remove residual air therefrom; and then
    b) contacting the foodstuff with a gaseous mixture containing ozone at a temperature from 0.1° C.–70° C. under pressure for a time effective to substantially disinfect the foodstuff.

36. The method of claim 35, wherein said fungi is selected from the group consisting of fungi producing aflatoxin, ochratoxin A, and ochratoxin B.

37. The method of claim 35, wherein said fungi is selected from the group consisting of *Aspergillus flavus, Aspergillus ochraceus, Penicillium toxicarium*, and *Fusarium graminearum*.

38. The method of claim 35, wherein said foodstuff is selected from the group consisting of grains and nuts.

39. The method of claim 38, wherein said nuts are selected from the group consisting of peanuts and Brazil nuts.

40. The method of claim 38, wherein said grains are selected from the group consisting of cereal grains.

41. The method of claim 35, which is conducted without ultra-violet radiation.

42. The method of claim 35, which is conducted on-site where said foodstuff is either prepared or processed for distribution or both.

43. The method of claim 35, wherein said vacuum treatment comprises subjecting the foodstuff to a vacuum of from about 0.1 to 30 torr of Hg for 1 sec. to 1 hr.

44. The method of claim 35, wherein at least 99% of all fungi are eliminated.

45. The method of claim 44, wherein at least 99.9% of all fungi are eliminated.

46. A method of disinfecting a foodstuff using a gaseous mixture containing ozone, which comprises:
    a) subjecting the foodstuff to a vacuum treatment in order to remove residual air therefrom; and then
    b) contacting the foodstuff with a gaseous mixture containing at least about 0.1 ppm of ozone at a temperature from 0.1° C.–70° C. for a time effective to substantially disinfect the foodstuff.

47. The method of claim 46, wherein said gaseous mixture containing ozone is introduced as a continuous gaseous stream in a food processing apparatus containing the foodstuff.

48. The method of claim 46, wherein said foodstuff is subjected to a batch treatment with said gaseous mixture containing ozone.

49. The method of claim 46, wherein said foodstuff is subjected to treatment with said gaseous mixture containing ozone under pressure.

50. The method of claim 46, which further comprises subjecting said foodstuff to vacuum treatment in order to remove residual air therefrom prior to said treatment with said gaseous mixture containing ozone.

51. The method of claim 46, wherein said gaseous mixture containing ozone is generated by feeding oxygen, air or a mixture of oxygen and air to an ozone generator prior to treating said foodstuff.

52. The method of claim 46, wherein said gaseous mixture containing ozone further contains an inert gas selected from the group consisting of nitrogen, carbon dioxide, argon, krypton, xenon and neon.

53. The method of claim 46, wherein said foodstuff is selected from the group consisting of grains, meat, poultry, seafood, bread, cereal, pasta, juices, fruit, vegetables, snack products.

54. The method of claim 46, wherein said gaseous mixture contains up to about 15% by wt. of ozone based upon the total weight of the gaseous mixture.

55. The method of claim 46, wherein said foodstuff is contacted with said gaseous mixture containing ozone for at least 1 sec.

56. The method of claim 55, wherein said foodstuff is contacted with said gaseous mixture containing ozone for from about 1 sec to about 10 hrs.

57. The method of claim 46, wherein said gaseous stream comprises up to 15% by wt. of ozone, and is in contact with said foodstuff for from 1 sec. to 10 hrs.

58. The method of claim 57, wherein said gaseous stream has a flowrate of 0.001 to 100 l/s.

59. The method of claim 46, wherein said gaseous mixture in said batch treatment comprises up to 15% by wt. of ozone, and is in contact with said foodstuff for from 1 sec. to 10 hrs.

60. The method of claim 46, wherein said gaseous mixture is at a pressure of from 0.1 to 20 bar.

61. The method of claim 46, wherein said vacuum treatment comprises subjecting said foodstuff to a reduced pressure of from about 0.1 to 30 in Hg from about 1 sec to about 24 hrs.

62. The method of claim 46, wherein said foodstuff is a dry foodstuff.

63. The method of claim 46, wherein said foodstuff is an intermediate-moisture foodstuff.

64. The method of claim 46, wherein said foodstuff is disinfected for bacteria causing food-borne illness in a mammal.

65. The method of claim 46, which is conducted without ultra-violet radiation.

66. The method of claim 46, in which not more than one vacuum step is employed.

67. A method of disinfecting a foodstuff against bacteria causing food-borne illness using a gaseous mixture containing ozone, which comprises:
   a) subjecting the foodstuff to a vacuum treatment in order to remove residual air therefrom; and then
   b) contacting the foodstuff with a gaseous mixture containing at least 0.1 ppm of ozone at a temperature from 0.1° C.–70° C. under pressure for a time effective to substantially disinfect the foodstuff.

68. The method of claim 67, wherein said bacteria is selected from the group consisting of bacteria producing a toxin, an enzyme or both, as a mechanism of pathogenicity.

69. The method of claim 67, wherein said bacteria is selected from the group consisting of *Escherichia, Salmonella, Staphylococcus* and *Streptococcus*.

70. The method of claim 69, wherein said bacteria is selected from the group consisting of *Staphylococcus aureus, Streptococcusfacialis, Clostridium botulinum, Clostridium perfringeus* and *Escherichia coli* 0157:H7.

71. The method of claim 67, wherein said foodstuff is ground beef.

72. The method of claim 67, wherein said vacuum treatment comprises subjecting the foodstuff to a vacuum of from about 0.1 to 30 torr of Hg for 1 sec. to 1 hr.

73. The method of claim 67, wherein at least 99% of all bacteria are eliminated.

74. The method of claim 73, wherein at least 99.9% of all bacteria are eliminated.

75. A method of disinfecting a foodstuff against fungi and preventing mycotoxicosis using a gaseous mixture containing ozone, which comprises:
   a) subjecting the foodstuff to a vacuum treatment in order to remove residual air therefrom; and then
   b) contacting the foodstuff with a gaseous mixture containing at least 0.1 ppm ozone at a temperature from 0.1° C.–70° C. under pressure for a time effective to substantially disinfect the foodstuff.

76. The method of claim 75, wherein said fungi is selected from the group consisting of fungi producing aflatoxin, ochratoxin A, and ochratoxin B.

77. The method of claim 76, wherein said fungi is selected from the group consisting of *Aspergillus flavus, Aspergillus ochraceus, Penicillium toxicarium*, and *Fusarium graminearum*.

78. The method of claim 76, wherein said foodstuff is selected from the group consisting of grains and nuts.

79. The method of claim 78, wherein said nuts are selected from the group consisting of peanuts and Brazil nuts.

80. The method of claim 78, wherein said grains are selected from the group consisting of cereal grains.

81. The method of claim 76, which is conducted without ultra-violet radiation.

82. The method of claim 76, which is conducted on-site where said foodstuff is either prepared or processed for distribution or both.

83. The method of claim 75, wherein said vacuum treatment comprises subjecting the foodstuff to a vacuum of from about 0.1 to 30 torr of Hg for 1 sec. to 1 hr.

84. The method of claim 75, wherein at least 99% of all fungi are eliminated.

85. The method of claim 84, wherein at least 99.9% of all fungi are eliminated.

86. A method of disinfecting a foodstuff against viruses using a gaseous mixture containing ozone, which comprises:
   a) subjecting the foodstuff to a vacuum treatment in order to remove residual air therefrom; and then
   b) contacting said foodstuff with an effective amount of a gaseous mixture containing ozone at a temperature from 0.1° C.–70° C. under pressure for a time effective to substantially disinfect the foodstuff.

87. The method of claim 86, which is conducted without ultraviolet radiation.

88. The method of claim 86, wherein the gaseous mixture comprises from 0.1 ppm of 15% by wt. of ozone, and is in contact with said foodstuff from 1 sec. to 10 min.

89. The method of claim 86, wherein the gaseous mixture is at a pressure of from 0.1 to 20 bar.

90. The method of claim 86, wherein at least 99% of all viruses are eliminated.

91. The method of claim 90, wherein at least 99.9% of all viruses are eliminated.

* * * * *

UNITED STATES PATENT AND TRADEMARK OFFICE
CERTIFICATE OF CORRECTION

PATENT NO.    : 6,294,211 B1
DATED         : September 25, 2001
INVENTOR(S)   : James T.C. Yuan et al.

It is certified that error appears in the above-identified patent and that said Letters Patent is hereby corrected as shown below:

Column 8,
Line 44, please change the number "20" to the number -- 70 --.

Column 9,
Line 41, please change the number "20" to the number -- 70 --.

Column 11,
Line 64, please change the word "streptococcusfacialis" to the word
-- streptococcus facialis --.

Signed and Sealed this

Second Day of July, 2002

*Attest:*

*Attesting Officer*

JAMES E. ROGAN
*Director of the United States Patent and Trademark Office*